United States Patent
Li et al.

(10) Patent No.: US 8,526,959 B2
(45) Date of Patent: Sep. 3, 2013

(54) METHOD, SYSTEM, BASE STATION, AND USER EQUIPMENT FOR MACRO DIVERSITY COMBINING

(75) Inventors: Rongqiang Li, Shenzhen (CN); Yafei Sun, Shenzhen (CN); Wei Gu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 418 days.

(21) Appl. No.: 12/689,713

(22) Filed: Jan. 19, 2010

(65) Prior Publication Data

US 2010/0120421 A1    May 13, 2010

Related U.S. Application Data

(63) Continuation of application No. PCT/CN2008/071877, filed on Aug. 5, 2008.

(30) Foreign Application Priority Data

Aug. 10, 2007  (CN) .......................... 2007 1 0075691

(51) Int. Cl.
*H04W 36/00* (2009.01)
(52) U.S. Cl.
USPC ........... 455/444; 455/445; 455/442; 455/450; 370/331; 370/329; 370/328; 370/332
(58) Field of Classification Search
USPC ................. 455/436, 437, 438, 439, 440, 441, 455/442, 443, 444, 432.1, 432.2, 432.3, 445, 455/450; 370/331, 332, 329, 328
See application file for complete search history.

(56) References Cited

U.S. PATENT DOCUMENTS

| 6,895,258 B1* | 5/2005 | Scherzer et al. | 455/562.1 |
| 8,254,936 B2* | 8/2012 | Torsner et al. | 455/442 |
| 2003/0161284 A1* | 8/2003 | Chen | 370/331 |
| 2003/0171118 A1* | 9/2003 | Miya | 455/442 |
| 2004/0156329 A1* | 8/2004 | Bck et al. | 370/328 |

(Continued)

FOREIGN PATENT DOCUMENTS

| CN | 1355624 A | 6/2002 |
| CN | 1842050 A | 10/2006 |

(Continued)

OTHER PUBLICATIONS

"R3-071207: Enhancement of Uplink Macro Diversity Combining in Flat Evolved HSPA Architecture," 3GGP TSG RAN WG3 Meeting #56, Kobe, Japan, May 7-11, 2007, 4 pages.

(Continued)

*Primary Examiner* — Patrick N. Edouard
*Assistant Examiner* — Shantell L Heiber
(74) *Attorney, Agent, or Firm* — Slater & Matsil, L.L.P.

(57) ABSTRACT

A method and a system for implementing MDC, a base station, and a UE are provided herein. The method includes: a non-serving cell base station determines whether current services of a UE include a service whose feature meets the preset condition according to the features of the current services of the UE, and processes the service whose feature meets the preset condition as a service that needs MDC if such a service exists. Through the technical solution under the present invention, the MDC is implemented more flexibly according to the features of the current services of the UE to optimize the system performance.

16 Claims, 4 Drawing Sheets

(56) References Cited

U.S. PATENT DOCUMENTS

| | | | |
|---|---|---|---|
| 2006/0274638 A1* | 12/2006 | Walton et al. | 370/208 |
| 2007/0249340 A1* | 10/2007 | Hiltunen et al. | 455/433 |
| 2009/0238150 A1* | 9/2009 | Barrett | 370/335 |
| 2010/0120421 A1 | 5/2010 | Li et al. | |

FOREIGN PATENT DOCUMENTS

| | | |
|---|---|---|
| CN | 1929674 A | 3/2007 |
| CN | 101364825 B | 5/2012 |
| WO | 2007/045120 A1 | 4/2007 |
| WO | 2007/061342 A1 | 5/2007 |

OTHER PUBLICATIONS

Written Opinion of the International Searching Authority, International Application No. PCT/CN2008/071877, Applicant: Huawei Technologies Co., Ltd., et al., Dated: Nov. 13, 2008, 4 pages.

Chinese Office Action, Chinese Application No. 200710075691.1, Dated: Jul. 14, 2011, 12 pages.

\* cited by examiner

METHOD, SYSTEM, BASE STATION, AND USER EQUIPMENT FOR MACRO DIVERSITY COMBINING

CROSS-REFERENCE TO RELATED APPLICATIONS

This application is a continuation of International Application No. PCT/CN2008/071877, filed on Aug. 5, 2008, which claims priority to Chinese Patent Application No. 200710075691.1, filed on Aug. 10, 2007, both of which are hereby incorporated by reference in their entireties.

FIELD OF THE INVENTION

The present invention relates to network communication technologies, and in particular, to a method, a system, a base station, and a User Equipment (UE) for macro diversity combining.

BACKGROUND

Universal Mobile Telecommunications System (UMTS) is a $3^{rd}$ Generation (3G) system based on a Wideband Code Division Multiple Access (WCDMA) air interface technology. Generally, the UMTS is also known as a WCDMA system. In the UMTS system, the coverage areas of adjacent cells are overlapped, and seamless handover is provided through soft handover. The gain accomplished through Macro Diversity Combining (MDC) enhances the system capabilities in resisting interference.

With the development of mobile communication technologies, the 3G technologies are developing and evolving. High Speed Uplink Packet Access (HSUPA) is introduced in the $3^{rd}$ Generation Partnership Project (3GPP) release 6 (R6). The HSUPA also supports the uplink macro diversity technology.

A brief process of implementing the MDC is: The mobile station in the soft handover communicates with multiple base stations through different air interface channels. For the uplink, multiple base stations receive the uplink user data in the code division channel of the mobile station. The uplink user data received by the base stations is sent to a Radio Network Controller (RNC) so that the data can be selected and combined. The RNC uses a frame reliability indicator provided for the outer loop power control to select preferred uplink user data, and sends the selected data to a core network.

The foregoing network architecture is based on the 3GPP of a version earlier than R6. In order to improve the lifecycle of the WCDMA and protect the existing investment of the operator, the 3GPP puts forward an Evolved High Speed Packet Access (E-HSPA) evolution. The E-HSPA aims to improve the spectrum efficiency on the existing R6 version, reduce the delay of the control plane and the user plane, be compatible with old systems, and evolve to the Long Term Evolution 3GPP (LTE)/System Architecture Evolution (SAE) system smoothly, including enhancement of the air interface performance and evolution of the Radio Access Network (RAN) architecture.

In the E-HSPA network, the RNC function is shifted to the NodeB+ (E-HSPA NodeB). The NodeB+ is directly connected with the core network through an IuPS interface.

In the E-HSPA network, a process of implementing the MDC is: The uplink MDC is implemented in the serving cell base station of the user; for data on all radio links in an active set, if the data received on the radio link corresponding to a non-serving cell base station is correct, the non-serving cell base station sends the uplink data to the serving cell base station. The serving cell base station performs MDC for the received uplink data, and sends the data to the core network. This solution is similar to implementation of the MDC in the RNC in the existing 3G system except that the location for implementing the MDC function changes from the RNC to the serving cell base station. If the uplink macro diversity is implemented on the serving cell base station (capable of the functions of a Serving RNC (SRNC)), communication is required between base stations. If all other soft handover base stations transmit uplink receiving data to the serving cell base station for macro diversity processing, the transmission at the interface between base stations is overloaded (the last mile transmission resources are not enough), and the user-plane delay occurs.

Therefore, no matter whether the HSUPA system or the E-HSPA is introduced, the foregoing solution is based on the prerequisite of implementing the MDC. Such a solution is not flexible. For example, if the operator expects to save transmission resources at the cost of reducing performance, the solution does not fulfill that expectation.

Nevertheless, the MDC may be omitted in the foregoing system to save the transmission resources between base stations. However, if the macro diversity is not implemented, the performance is deteriorated to some extent. Therefore, this solution is based on the prerequisite of not accomplishing the MDC gain, and reduces system performance to some extent.

In the process of developing the present invention, the inventor finds at least the following defects in the prior art: The MDC may be employed or not in the solution in the prior art, but it is not considered that the obtained gain is different for different services. Therefore, the solution in the prior art is unable to implement the MDC more flexibly according to the service features and improve the system performance.

SUMMARY

The embodiments of the present invention provide a method and a system for implementing MDC, a base station, and a UE to implement MDC more flexibly according to the features of the current service of the UE and optimize the system performance.

The method for implementing Macro Diversity Combining (MDC) is applicable to a communication system that includes a non-serving cell base station and a UE. The method includes:

determining, by a non-serving cell base station, whether current services of a UE include a service whose feature meets the preset condition according to the features of the current services of the UE; and processing, by the non-serving cell base station, the service whose feature meets the preset condition as a service that needs MDC if the result of the determining is that such a service exists.

A base station provided in an embodiment of the present invention implements MDC, and includes:

a determining unit, adapted to determine whether current services of a UE include a service whose feature meets the preset condition according to the features of the current services of the UE; and a processing unit, adapted to process the service whose feature meets the preset condition as a service that needs MDC if the determining unit determines that such a service exists.

A network node provided in an embodiment of the present invention implements MDC operations, and includes:

a receiving unit, adapted to receive services from a non-serving cell base station, where the services are determined as requiring MDC according to service features; and an MDC executing unit, adapted to execute MDC operations for the services received by the receiving unit.

A UE provided in an embodiment of the present invention is applied in an MDC implementation process in soft handover, and includes:

an indication receiving unit, adapted to receive an indication from a network node, where the indication indicates that the service requiring MDC and the service requiring no MDC need to be carried in different transmission blocks if both the service requiring MDC and the service requiring no MDC coexist in the current services of the UE;

a processing unit, adapted to add the service requiring MDC and the service requiring no MDC into different transmission blocks according to the indication received by the indication receiving unit; and a sending unit, adapted to send the transmission blocks processed by the processing unit to the non-serving cell base station.

A system for implementing MDC in an embodiment of the present invention includes a UE, a non-serving cell base station, and a network node that executes MDC.

The non-serving cell base station includes:

a determining unit, adapted to determine whether current services of a UE include a service whose feature meets the preset condition according to the features of the current services of the UE; and a processing unit, adapted to process the service whose feature meet the preset condition as a service that needs MDC if the determining unit determines that such a service exists.

The network node that executes MDC includes:

a receiving unit, adapted to receive services from a non-serving cell base station, where the services are determined as requiring MDC according to service features; and an MDC executing unit, adapted to execute MDC operations for the services received by the receiving unit.

In the technical solution under the present invention, the non-serving cell base station determines whether a UE service meets the preset condition, and processes the service that meets the preset condition as a service that requires MDC. Therefore, the MDC is implemented more flexibly according to the service features to improve the system performance.

DETAILED DESCRIPTION

Figure 1:
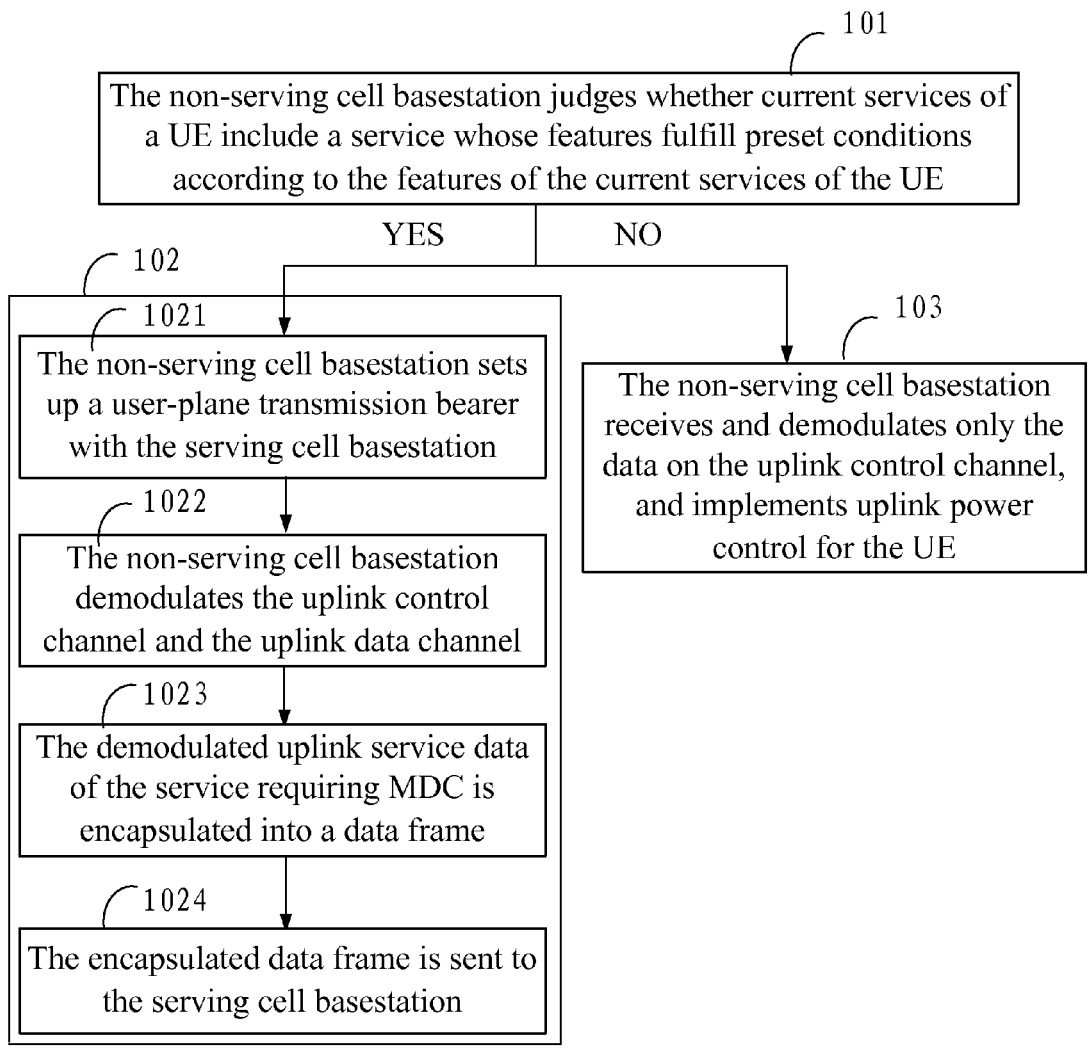
FIG. 1 shows a method for implementing MDC in an E-HSPA system in the first embodiment of the present invention.

The method for implementing MDC in the embodiments of the present invention is described below. The embodiments are for the exemplary purpose only. The embodiments of the present invention use the WCDMA system and the E-HSPA system as examples. It is understandable that the technical solution under the present invention is also applicable to the systems such as LTE/SAE.

In the method embodiments, a non-serving cell base station determines whether current services of a UE include a service whose feature meets preset condition according to the features of the current services of the UE, and processes the service whose feature meets the preset condition as a service requiring MDC if such a service exists, and then proceeds with the subsequent process accordingly.

The preset conditions may be set by the system. After the system sets the conditions, the conditions may be configured in each network node, for example, serving cell base station in the WCDMA, RNC, serving cell base station in the E-HSPA system, non-serving cell base station; or the conditions are configured in one or several network nodes first, and then the network node that has configured the conditions notifies the conditions to other network nodes.

As mentioned above, the conditions are diversified and may include:

1. From the perspective of the service rate, if the service rate of the UE service is lower than the first threshold, the preset condition is met. The first threshold may be set according to the system policy, for example, the first threshold is 100 Kbps.

2. From the perspective of the service priority, if the service priority of the UE service is higher than the second threshold, the preset condition is met. The second threshold may be set according to the system policy, for example, the services whose priority is higher than 10 are set as the services requiring MDC.

3. The service type is used as a condition. For example, Circuit Switched (CS) voice, Voice over Internet Protocol (VoIP) voice, quasi-real-time game services or low-speed interaction services, and background services are treated as services that require MDC.

4. Both the service rate and the service priority are taken into account. If the service rate of a UE service is lower than the third threshold and the service priority of the UE service is higher than the fourth threshold, the preset condition is met. The third threshold may be the same as or different from the first threshold above, and the fourth threshold may be the same as or different from the second threshold above.

5. The conditions may also be other combinations of the factors listed above, for example, "service rate+service type", "service priority+service type", "service rate+service priority+service type", and so on. The embodiments of the present invention do not restrict the preset conditions.

After the services that require MDC are determined, the non-serving cell base station handles the services, as described briefly below.

If a service requiring MDC exists in the current services of the UE, the non-serving cell base station sets up a user-plane transmission bearer with the network node that executes an MDC operation, and sends the uplink user data corresponding to the service that requires MDC to the network node that executes the MDC operation through the user-plane transmission bearer. In the WCDMA system, the network node is an RNC; in the E-HSPA system, the network node is a serving cell base station (capable of the functions of an SRNC); in the LTE system, the network node is a serving cell base station (E-NODEB).

If no service requiring MDC exists in the current services of the UE, the non-serving cell base station does not set up a user-plane transmission bearer with the foregoing network node, namely, does not forward the uplink user data. Moreover, the non-serving cell base station may demodulate only the uplink control channel of the air interface, and implement uplink power control for the UE in order to control interference.

The technical solution under the present invention is elaborated below with reference to some exemplary embodiments.

Embodiment 1

Supposing that the current services of the UE include only a low-speed and real-time VoIP service in the E-HSPA system, the method for implementing MDC in this embodiment is described below. FIG. 1 shows a method for implementing MDC in this embodiment.

In the soft handover state, the serving cell base station needs to trigger the non-serving cell to set up a radio link that bears the user service first.

For example, if the serving cell base station determines the need of adding the non-serving cell into an active set according to a measurement report of the UE, the serving cell base station triggers the non-serving cell base station to set up a radio link that bears the user services. The non-serving cell base station receives the services sent by the UE on the radio link, and then makes the judgment in step 101.

Step 101: The non-serving cell base station determines whether the current services of the UE include a service whose feature meets the preset condition according to the features of the current services of the UE; and the process proceeds to step 102 if the result of the determining is that such a service exists, or the process proceeds to step 103 if no such service exists.

It is assumed that the preset condition of the embodiment is "service rate+service priority", and more specifically, "the service rate is less than 100 Kbps and the service priority is higher than 10". In this embodiment, it is assumed that the current services of the UE include the VoIP service only, and the VoIP service meets the foregoing conditions. Therefore, the non-serving cell base station determines that the VoIP service feature meets the preset condition, namely, a service consistent with the preset condition exists in the current services of the UE, and then the process proceeds to step 102.

Step 102: The non-serving cell base station processes the service consistent with the preset condition as a service that requires MDC.

This step includes the following sub-steps:

Step 1021: After determining that a service consistent with the preset condition exists in the current services of the UE, the non-serving cell base station sets up a user-plane transmission bearer with the serving cell base station.

Step 1022: The non-serving cell base station demodulates the uplink control channel and the uplink data channel.

In this step, the non-serving cell base station processes the uplink service data sent by the UE by demodulating the uplink control channel and the data channel. This service data requires MDC.

Step 1023: The non-serving cell base station encapsulates the demodulated uplink service data of the service requiring MDC into a data frame.

Step 1024: The non-serving cell base station sends the encapsulated data frame to the network node that executes MDC, namely, the serving cell base station.

In this step, the non-serving cell base station sends the data frame to the serving cell base station on the user-plane transmission bearer set up in step 1021. The data frame may be a Frame Protocol (FP) data frame, or a MAC-d stream that includes an FP packet header.

It is understandable that the non-serving cell base station sends only the correctly received data to the serving cell base station. Therefore, step 102 includes details of data check. The details of data check are well known in the art, and are not elaborated herein.

It is understandable that after receiving the data frame, the serving cell base station performs MDC operations for the data frame according to the prior art, which is not elaborated herein.

Step 103: The non-serving cell base station receives and demodulates only the data on the uplink control channel, and performs uplink power control for the UE.

In this embodiment, it is assumed that only the VoIP service exists, and therefore, it is not necessary to perform step 103. Step 102 also involves a step of performing power control for the UE through the control channel, but the difference lies in that: In step 103, the non-serving cell base station does not set up the user-plane transmission bearer with the serving cell base station, namely, the non-serving cell base station does not forward the uplink user data, and does not need to demodulate the uplink data channel.

Embodiment 2

Figure 2:
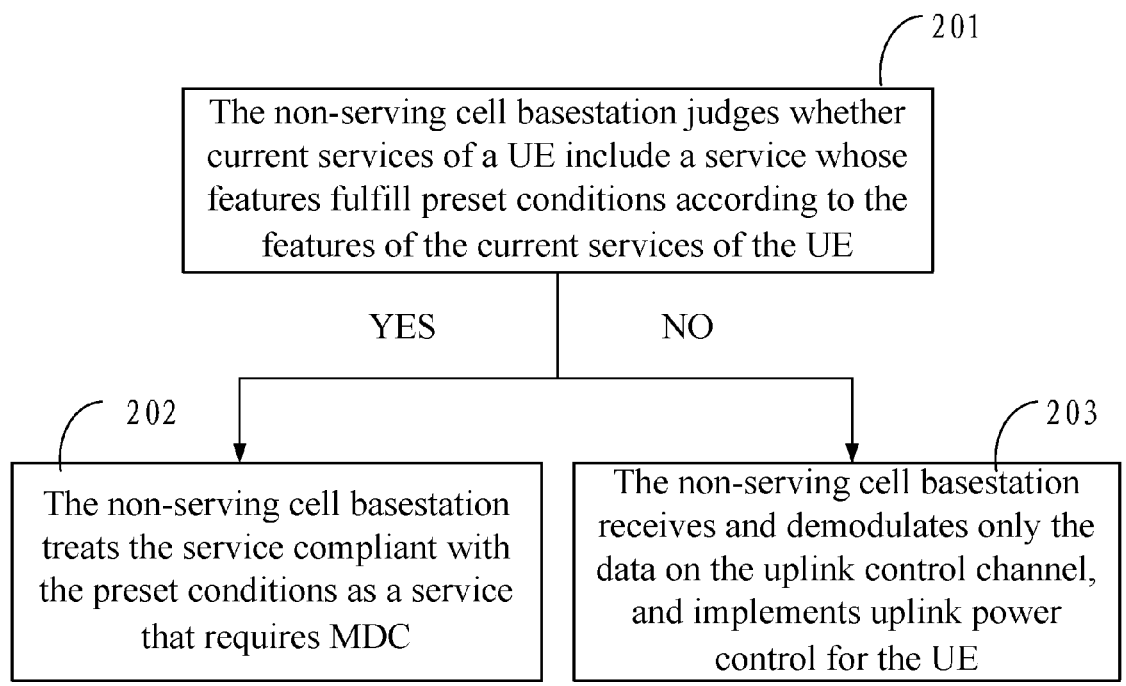
FIG. 2 shows a method for implementing MDC in an E-HSPA system in the second embodiment of the present invention.

Supposing that the current services of the UE include only a high-speed file transfer service in the E-HSPA system, the method for implementing MDC in this embodiment is described below. FIG. 2 shows a method for implementing MDC in this embodiment.

Step 201: The non-serving cell base station determines whether the current services of the UE include a service whose feature meets the preset condition according to the features of the current services of the UE, and the process proceeds to step 202 if such a service exists, or the process proceeds to step 203 if no such service exists.

It is assumed that the preset condition of the embodiment is "service rate+service priority", and more specifically, "the service rate is higher than 100 Kbps and the service priority is higher than 10". In this embodiment, it is assumed that the current services of the UE include only the high-speed file transfer service. The non-serving cell base station determines that the features of the high-speed file transfer service does not meet the preset condition, namely, the current services of the UE include no service whose feature meets the preset condition, and then the process proceeds to step 203.

Step 202: The non-serving cell base station processes the service consistent with the preset condition as a service that requires MDC.

In this embodiment, it is assumed that only a high-speed file transfer service exists, and therefore, it is not necessary to perform step 202.

Step 203: The non-serving cell base station receives and demodulates only the data on the uplink control channel, and implements uplink power control for the UE.

In this step, the service does not require MDC, namely, no service requiring MDC exists in the current services. Therefore, the non-serving cell base station does not set up a user-plane transmission bearer with the serving cell base station, namely, does not forward the uplink user data. Moreover, the non-serving cell base station may receive and demodulate only the data on the uplink control channel of the air interface, and implement uplink power control for the UE in order to control interference.

Specifically, at the time of setting up the non-serving radio link, only an uplink control channel and a downlink control channel are set up in the radio link, where the uplink control channel is designed to estimate how much contribution is made by the UE to the uplink load of the cell, and the downlink control channel is designed to control the transmitting power of the UE; the non-serving cell base station estimates the UE contribution to the uplink load of the cell according to the signals received from the uplink control channel, and controls the uplink transmitting power of the UE through the downlink control channel according to the estimation result. This mode of controlling interference saves the resources for demodulating the uplink data channel of the non-serving cell.

Embodiment 3

Figure 3:
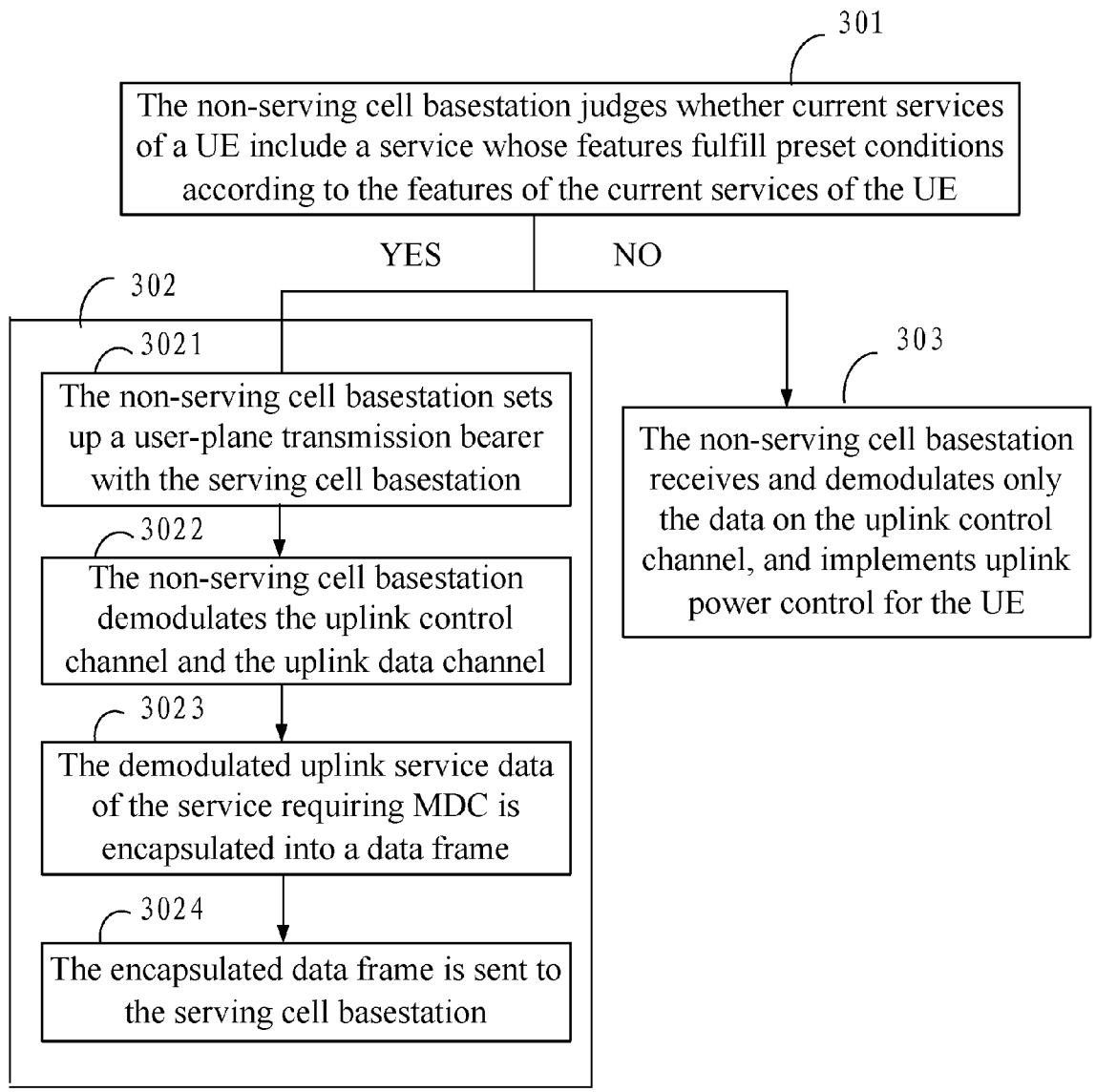
FIG. 3 shows a method for implementing MDC in an E-HSPA system in the third embodiment of the present invention.

Supposing that the current services of the UE include both a low-speed and real-time VoIP service and a high-speed file transfer service in an E-HSPA system, the method for implementing MDC in this embodiment is described below. As shown in FIG. 3, the method includes the following steps:

Step 301: The non-serving cell base station determines whether the current services of the UE include a service whose feature meets the preset condition according to the features of the current services of the UE, and the process proceeds to step 302 if such a service exists, or the process proceeds to step 303 if no such service exists.

It is assumed that the preset condition of the embodiment is "service rate+service priority", and more specifically, "the service rate is higher than 100 Kbps and the service priority is higher than 10". The current services of the UE include two service types of different features. According to the rules preset by the system, the features of the VoIP service meet the preset condition, namely, the service requires MDC; and the features of the high-speed file transfer service do not meet the preset condition, namely, the service does not require MDC. Therefore, the non-serving cell determines that the current services of the UE include a service whose feature meets the preset condition, and then the process proceeds to step 302.

The UE currently has two service types that are of different features and need to be processed differently. Therefore, the UE may send the services to the non-serving cell base station in two modes.

Mode 1: The service consistent with the preset condition and the service inconsistent with the preset conditions are carried in different transmission blocks, and sent to the non-serving cell base station. That is, the VoIP service and the high-speed file transfer service are not multiplexed in the same transmission block.

Mode 2: The service data consistent with the preset condition and the service data inconsistent with the preset condition are carried in the same transmission block, namely, the VoIP service and the high-speed file transfer service are multiplexed in the same transmission block.

If the UE sends the service data in the first mode, the serving cell base station may set that the service requiring MDC and the service not requiring MDC are multiplexed in different transmission blocks, and the serving cell base station notifies this rule to the UE, or the system presets this rule.

Step 302: The non-serving cell base station treats the VoIP service consistent with the preset condition as a service that requires MDC and processes the VoIP service.

This step includes the following steps:

Step 3021: After determining existence of a VoIP service that requires MDC, namely, after determining that a service requiring MDC exists in the current services of the UE, the non-serving cell base station sets up a user-plane transmission bearer with the serving cell base station.

Step 3022: The non-serving cell base station demodulates the uplink control channel and the uplink data channel.

In this step, the non-serving cell base station processes the service data sent by the UE by demodulating the uplink control channel and the uplink data channel. This service data is the VoIP service data that requires MDC.

Step 3023: The non-serving cell base station encapsulates the demodulated uplink service data of the service requiring MDC into a data frame.

In step 301, the UE may send service data to the non-serving cell base station in different modes. Therefore, the corresponding processing mode is applied in step 3023:

If mode 1 is applied in step 301, namely, the service data requiring MDC and the service data requiring no MDC are not multiplexed in the same transmission block, the non-serving cell base station encapsulates the transmission block of the service whose feature meets the preset condition into the first data frame, and sends the first data frame to the serving cell base station on the transmission bearer set up in step 3021.

If such a mode is applied, the non-serving cell may work based on the existing implementation mode without further modification.

If mode 2 is applied in step 301, namely, the service data requiring MDC and the service data requiring no MDC are multiplexed in the same transmission blocks, the non-serving cell base station De-multiplexes the transmission block, encapsulates the service whose feature meets the preset condition into the first data frame, and sends the first data frame to the serving cell base station on the transmission bearer set up in step 3021.

Step 3024: The non-serving cell base station sends the encapsulated data frame of the VoIP service to the serving cell base station.

The non-serving cell base station sends the data frame to the serving cell base station on the user-plane transmission bearer set up in step 3021.

It is understandable that after receiving the encapsulated data frame, the serving cell base station performs MDC operations for the data frame according to the prior art, which is not repeated here any further.

Step 303: The non-serving cell base station receives and demodulates only the data on the uplink control channel, and implements uplink power control for the UE.

In this embodiment, it is assumed that the service requiring MDC exists, and therefore, it is not necessary to perform step 303. Step 302 also involves a step of performing power control for the UE through the control channel, but the difference is: In step 303, the non-serving cell base station does not set up the user-plane transmission bearer with the serving cell base station, namely, the non-serving cell base station does not forward the uplink user data, and does not need to demodulate the uplink data channel.

The technical solution applied to a WCDMA system differs from the technical solution applied to an E-HSPA system in the foregoing embodiment in that: (1) in the WCDMA system, the network node that executes MDC is an RNC; and (2) if both the service requiring MDC and the service requiring no MDC coexist in the current services of the UE, the network node that presets the sending mode of the UE in the WCDMA system may be an RNC. Because the basic process of the technical solution applied in the WCDMA system is the same, the technical solution applied in the WCDMA system is not detailed here any further.

Embodiment 4

Figure 4:
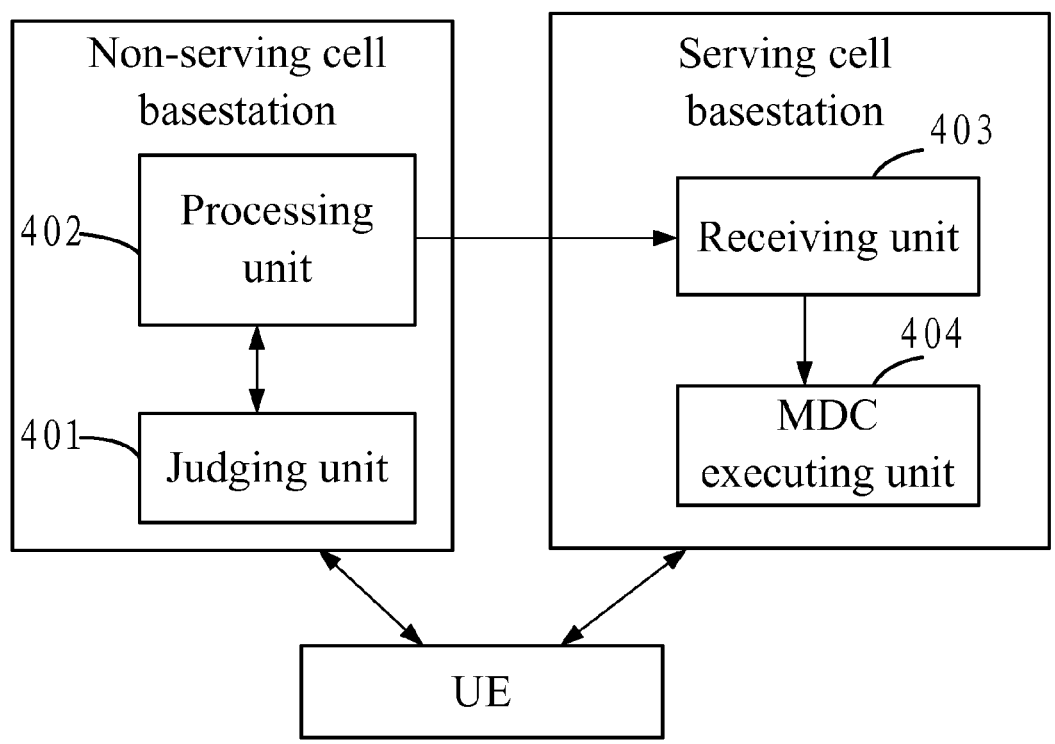
FIG. 4 shows a structure of a system for implementing MDC in the fourth embodiment of the present invention.

This embodiment provides a system for implementing MDC, for example, an E-HSPA system. FIG. 4 shows a system structure in this embodiment.

The system includes a UE, a non-serving cell base station, and a network node for executing MDC. In this system, the network node is a serving cell base station.

The non-serving cell base station includes:

a determining unit 401, adapted to determine whether current services of a UE include a service whose feature meets the preset condition according to the features of the current services of the UE; and a processing unit 402, adapted to process the service whose feature meets the preset condition as a service that needs MDC if the determining unit determines that such a service exists.

The serving cell base station includes:

a receiving unit 403, adapted to receive services from a non-serving cell base station, where the services are determined as requiring MDC according to service features; and an MDC executing unit 404, adapted to execute MDC operations for the services received by the receiving unit.

The non-serving cell base station and the serving cell base station are elaborated below.

The non-serving cell base station includes:

a determining unit, adapted to determine whether current services of a UE include a service whose feature meets the preset condition according to the features of the current services of the UE; and a processing unit, adapted to process the service whose feature meets the preset condition as a service that needs MDC if the determining unit determines that such a service exists.

Further, the processing unit may include:

a bearer setup subunit, adapted to set up a user-plane bearer with the network node that performs MDC if the determining unit determines that such a service exists; and a sending subunit, adapted to send the service whose feature meets the preset condition to the network node that performs MDC on the bearer set up by the bearer setup subunit.

In the system in this embodiment, the network node that performs MDC is a serving cell base station.

Further, the sending subunit may include:

a demodulating subunit, adapted to demodulate the uplink control channel and the uplink data channel;

an encapsulating subunit, adapted to encapsulate the demodulated uplink service data of the service requiring MDC into a data frame; and an executing subunit, adapted to send the encapsulated data frame to the network node that performs the MDC.

If the determining unit gives a negative result, the non-serving cell base station may include a power control unit, which is adapted to receive and demodulate only the data on the uplink control channel when the determining unit gives a negative result, and implement uplink power control for the UE.

Further, the judging unit may include a receiving subunit, adapted to receive services sent by the UE. If the services include both the service whose feature meets the preset condition and the service whose feature does not meet the preset condition, the service whose feature meets the preset condition and the service whose feature does not meet the preset condition are carried in different transmission blocks.

Embodiment 5

This embodiment provides a UE. The UE is adapted to implement MDC in soft handover, and includes:

an indication receiving unit, adapted to receive an indication from a network node, where the indication indicates that the service requiring MDC and the service requiring no MDC need to be carried in different transmission blocks if both the service requiring MDC and the service requiring no MDC coexist in the current services of the UE;

a processing unit, adapted to process the service requiring MDC and the service requiring no MDC into different transmission blocks according to the indication received by the indication receiving unit; and a sending unit, adapted to send the transmission blocks processed by the processing unit to the non-serving cell base station.

In the technical solution under the present invention, the non-serving cell base station determines whether the UE service meets the preset condition according to the service feature, and decides whether to treat this service as the service requiring MDC. Therefore, the MDC is implemented more flexibly according to the service features. For the service that needs to implement uplink macro diversity, the non-serving cell base station forwards the data to the serving cell base station; for the service that does not need to implement uplink macro diversity, the non-serving cell base station does not need to forward the data to the serving cell base station, and may demodulate only the data on the uplink data channel of the air interface and perform uplink power control for the UE. For example, if the preset condition is that the low-speed and real-time services need MDC, for the low-speed and real-time services, the uplink MDC gain may be used to improve the performance; for the high-speed non-real-time services (such as web browse, high-speed data transfer), the uplink MDC may be cancelled to reduce waste of transmission resources. After the uplink macro diversity solution is performed selectively according to the service features, the waste of transmission resources is overcome, and the system performance is optimized for different services.

Moreover, the network node may preset the service features of the service that requires MDC, and perform operations according to the preset conditions.

If it is preset that the service data requiring MDC and the service data requiring no MDC are multiplexed in different transmission blocks, the non-serving cell may work based on the existing implementation mode without modification. This rule may be set in the serving cell base station, and notified to the UE, or set by the system. It is understandable that when the current services of the UE include many service types, the UE may send the service data to the non-serving cell base station in different modes. The embodiments of the present invention provide possibility of diversified technical implementations, implement MDC more flexibly according to the features of the current service of the UE, and optimize the system performance.

It is understandable that the technical solution under the present invention is applicable not only to WCDMA and E-HSPA systems, but also to LTE and SAE systems. In other systems, the network node that performs MDC is different.

Although the invention has been described through several preferred embodiments, the invention is not limited to such embodiments. It is apparent that those skilled in the art can make modifications and variations to the invention without departing from the scope of the invention. The invention is intended to cover the modifications and variations provided that they fall in the scope of protection defined by the following claims or their equivalents.

What is claimed is:

1. A method for implementing Macro Diversity Combining (MDC)-, the method comprising:
   determining, by a non-serving cell base station, whether current services of a UE include a service with a feature that meets a preset condition according to features of the current services of the UE;
   processing, by the non-serving cell base station, the service with the feature that meets the preset condition as a service requiring MDC if the result of the determining is that current services of the UE include a service with a feature that meets the preset condition; and
   receiving and demodulating, by the non-serving cell base station, only the data on the uplink control channel, and performing uplink power control for the UE, if the result of the determining is that current services of the UE do not include a service with a feature that meets the preset condition.

2. The method according to claim 1, wherein the preset condition comprises one or any combination of:
   service rate of the service is lower than a first threshold;
   service priority of the service is higher than a second threshold;
   service type of the service meets a preset requirement.

3. The method according to claim 1, wherein processing the service comprises:
   setting up, by the non-serving cell base station, a user-plane transmission bearer with a network node that executes MDC; and
   sending, by the non-serving cell base station, uplink user data corresponding to the service requiring MDC to the network node that executes MDC through the user-plane transmission bearer.

4. The method according to claim 3, wherein sending the uplink data comprises:
   demodulating, by the non-serving cell base station, an uplink control channel and an uplink data channel;
   encapsulating, by the non-serving cell base station, the demodulated uplink service data of the service requiring MDC into a data frame; and
   sending, by the non-serving cell base station, the encapsulated data frame to the network node that executes MDC.

5. The method according to claim 3, wherein, before the determining, the method further comprises:
   receiving, by the non-serving cell base station, services sent by the UE;
   wherein the service requiring MDC and a service requiring no MDC are carried in different transmission blocks if both the service requiring MDC and the service requiring no MDC coexist in the current services of the UE.

6. The method according to claim 5, wherein sending the uplink user data comprises:
   demodulating, by the non-serving cell base station, an uplink control channel and an uplink data channel;
   encapsulating, by the non-serving cell base station, a transmission block of the service requiring MDC into a first data frame; and
   sending, by the non-serving cell base station, the first data frame to the network node that executes MDC.

7. A base station for implementing Macro Diversity Combining (MDC), the base station comprising:
   a determining unit, adapted to determine whether current services of a UE include a service with a feature that meets a preset condition according to features of current services of the UE;
   a processing unit, adapted to process the service with the feature that meets the preset condition as a service requiring MDC if the determining unit determines that current services of the UE include a service with a feature that meets the preset condition; and
   a power control unit, adapted to receive and demodulate only the data on the uplink control channel, and to implement uplink power control for the UE, if the determining unit determines that current services of the UE do not include a service with a feature that meets the preset condition;
   wherein the base station is a non-serving base station and the network node that executes MDC is a serving cell base station or a Radio Network Controller (RNC).

8. The base station of claim 7, wherein the processing unit comprises:
   a bearer setup subunit, adapted to set up a user-plane bearer with a network node that executes MDC if the determining unit determines that current services of the UE include a service with a feature that meets the preset condition; and
   a sending subunit, adapted to send the service requiring MDC to the network node that executes MDC on the bearer set up by the bearer setup subunit.

9. The base station of claim 8, wherein the sending subunit comprises:
   a demodulating subunit, adapted to demodulate an uplink control channel and an uplink data channel;
   an encapsulating subunit, adapted to encapsulate the demodulated uplink service data of the service requiring MDC into a data frame; and
   an executing subunit, adapted to send the encapsulated data frame to the network node that executes MDC.

10. The base station of claim 7, wherein the determining unit further comprises:
    a receiving subunit, adapted to receive services sent by the UE, wherein the service requiring MDC and a service requiring no MDC are carried in different transmission blocks when both the service requiring MDC and the service requiring no MDC coexist in the current services of the UE.

11. A system for implementing Macro Diversity Combining (MDC), the system comprising:
    a non-serving cell base station for implementing MDC, and
    a network node that executes MDC,
    wherein the non-serving cell base station comprises:
        a determining unit, adapted to determine whether current services of a UE include a service with a feature that meets a preset condition according to features of the current services of the UE;
        a processing unit, adapted to process the service with a feature that meets the preset condition as a service requiring MDC if the determining unit determines that current services of the UE include a service with a feature that meets the preset condition; and
        a power control unit, adapted to receive and demodulate only data on the uplink control channel, and to implement uplink power control for the UE, if the determining unit determines that current services of the UE do not include a service with a feature that meets the preset condition;
    wherein the network node that executes MDC is a serving cell base station or a Radio Network Controller and
    wherein the network node that executes MDC comprises:
        a receiving unit, adapted to receive services from the non-serving cell base station, wherein the services are determined as requiring MDC according to service features; and an MDC executing unit, adapted to execute MDC operations for the services received by the receiving unit.

12. The system of claim 11, wherein the processing unit comprises:
a bearer setup subunit, adapted to set up a user-plane bearer with the network node that executes MDC if the determining unit determines that current services of the UE include a service with a feature that meets the preset condition; and
a sending subunit, adapted to send the service requiring MDC to the network node that executes MDC on the bearer set up by the bearer setup subunit.

13. The system of claim 12, wherein the sending subunit comprises:
a demodulating subunit, adapted to demodulate an uplink control channel and an uplink data channel;
an encapsulating subunit, adapted to encapsulate the demodulated uplink service data of the service requiring MDC into a data frame; and
an executing subunit, adapted to send the encapsulated data frame to the network node that executes the MDC operation.

14. The system of claim 11, wherein the determining unit further comprises:
a receiving subunit, adapted to receive services sent by the UE, wherein the service requiring MDC and a service requiring no MDC are carried in different transmission blocks if both the service requiring MDC and the service requiring no MDC coexist in the current services of the UE.

15. The system of claim 14, wherein the network node that executes MDC further comprises:
a setting unit, adapted to set that the service requiring MDC and the service requiring no MDC need to be carried in different transmission blocks if both the service requiring MDC and the service requiring no MDC coexist in the current services of a UE, wherein the service requiring MDC is a service with a feature that meets a preset condition according to the feature of the service, and the service requiring no MDC is a service with a feature that does not meet the preset condition according to the feature of the service.

16. The system of claim 14, further comprising a UE, wherein the UE comprises:
an indication receiving unit, adapted to receive an indication from a network node, wherein the indication indicates that the service requiring MDC and the service requiring no MDC need to be carried in different transmission blocks when both the service requiring MDC and the service requiring no MDC coexist in the current services of the UE;
a processing unit, adapted to add the service requiring MDC and the service requiring no MDC into different transmission blocks according to the indication received by the indication receiving unit; and
a sending unit, adapted to send the transmission blocks processed by the processing unit to the non-serving cell base station.

* * * * *